(12) United States Patent
Riordan et al.

(10) Patent No.: US 10,275,803 B2
(45) Date of Patent: Apr. 30, 2019

(54) CONTENT DELIVERY METHOD

(71) Applicant: Smart.Market, Inc., Shreveport, LA (US)

(72) Inventors: Michael A. Riordan, Shreveport, LA (US); Joseph Benjamin Murray, Shreveport, LA (US); Ivan Jeremy Dane Wactor, Bossier City, LA (US); Robert Earl Murphy, Jr., Shreveport, LA (US)

(73) Assignee: Smart.Market, Inc., Shreveport, LA (US)

( * ) Notice: Subject to any disclaimer, the term of this patent is extended or adjusted under 35 U.S.C. 154(b) by 150 days.

(21) Appl. No.: 15/464,772

(22) Filed: Mar. 21, 2017

(65) Prior Publication Data
US 2017/0278142 A1   Sep. 28, 2017

Related U.S. Application Data

(60) Provisional application No. 62/311,642, filed on Mar. 22, 2016.

(51) Int. Cl.
*G06Q 30/02* (2012.01)
*H04L 29/08* (2006.01)
*H04W 4/02* (2018.01)

(52) U.S. Cl.
CPC ......... *G06Q 30/0271* (2013.01); *H04L 67/10* (2013.01); *H04L 67/18* (2013.01); *H04W 4/02* (2013.01)

(58) Field of Classification Search
USPC ...................................... 705/14.67
See application file for complete search history.

(56) References Cited

U.S. PATENT DOCUMENTS

| | | | |
|---|---|---|---|
| 8,510,773 B1* | 8/2013 | Abou-Rizk | G06Q 30/0261 725/32 |
| 2005/0216336 A1* | 9/2005 | Roberts | G06Q 30/0261 705/14.1 |
| 2006/0253864 A1 | 11/2006 | Easty | |
| 2006/0271552 A1 | 11/2006 | McChesney | |
| 2008/0301746 A1 | 12/2008 | Wiser et al. | |

(Continued)

FOREIGN PATENT DOCUMENTS

WO   2012109486   8/2012

OTHER PUBLICATIONS

International Search Report and Written Opinion dated Jun. 6, 2017, from Applicant's counterpart International Patent Application No. PCT/US2017/023391.

*Primary Examiner* — Jamie R Kucab
(74) *Attorney, Agent, or Firm* — Jones Walker LLP

(57) ABSTRACT

A method for sending content to a target audience uses a server in communication with a device and a database to create and customize a content selection, such as an advertisement, and to select a target audience meeting a characteristic criteria selection and a geographic criteria selection. The server generates and sends a personalized content output, including the content selection, to the target audience using digital or print delivery methods. The method may also include consumers interacting with content providers through a website or application. The consumers may customize the content that is received and the delivery method. The method may also include an incentive program for consumers.

11 Claims, 8 Drawing Sheets

(56) References Cited

U.S. PATENT DOCUMENTS

| | | |
|---|---|---|
| 2009/0187486 A1 | 7/2009 | Lefenfeld et al. |
| 2009/0187939 A1 | 7/2009 | Lajoie |
| 2009/0234711 A1 | 9/2009 | Ramer et al. |
| 2012/0054180 A1* | 3/2012 | Priyadarshan .... G06F 17/30528 707/731 |
| 2013/0055309 A1* | 2/2013 | Dittus ................ H04N 21/2668 725/35 |
| 2016/0086222 A1* | 3/2016 | Kurapati ............ G06Q 30/0204 705/14.53 |
| 2018/0253687 A1* | 9/2018 | Bornitz .............. G06Q 10/0833 |

* cited by examiner

US 10,275,803 B2

CONTENT DELIVERY METHOD

CROSS-REFERENCE TO RELATED APPLICATIONS

This application claims the benefit of and priority to U.S. Provisional Patent Application No. 62/311,642, filed on Mar. 22, 2016, which is fully incorporated herein by reference.

SUMMARY OF THE DISCLOSURE

Disclosed herein is a method for sending content to a target audience using a server in communication with two or more devices and a database. The database includes a marketing dataset containing a list of consumers, characteristic data for each consumer, and contact data for each consumer. The method includes the steps of: a) the server receiving from each of two or more devices a content selection, wherein each content selection is associated with a content provider account; b) the server receiving from each of two or more devices a characteristic criteria selection associated with each content selection; c) the server receiving from each of two or more devices a geographic criteria selection associated with each content selection, wherein the characteristic criteria selection and the geographic criteria selection associated with each content selection defines a target audience selection for the associated content selection; d) the server generating a target audience list for each content selection, wherein each target audience list includes a subset of the list of consumers from the marketing dataset, wherein the characteristic data for each consumer on each content selection's target audience list includes the characteristic criteria selection of the associated content selection, and wherein the contact data for each consumer on each content selection's target audience list includes a location indicator matching the geographic criteria selection of the associated content selection; e) the server saving in the database, target audience data for each consumer in each target audience list, wherein the target audience data indicates the one or more target audience lists on which the consumer is included; f) the server generating a personalized content output associated with each consumer included in each of the target audience lists based on the target audience data, wherein the personalized content output includes the content selection associated with each of the one or more target audience lists on which the consumer is included or the content selection associated with a subset of the one or more target audience lists on which the consumer is included; and g) the server sending each of the personalized content outputs to the associated consumer. Each of the two or more devices may include a desktop computer, a laptop computer, a handheld computer, a smart phone, a smart television, a smart watch, a tablet, or any other device configured to receive a communication from the server or to send a communication to the server. The server may communicate with each device through a webpage or application, but the method is not limited to these communication methods.

Step (a) may further include the server receiving from each of two or more devices a delivery method selection, with each delivery method selection being associated with one of the content selections. In step (f) each personalized content output may include content selections associated with a common delivery method selection; and in step (g) the server may use the common delivery method selection for each personalized content output to send each of the personalized content outputs to the associated consumer. Each delivery method selection may include email, text, programmatic digital display, application push, website display, or print delivery. The common delivery method selection for a print subset of personalized content outputs may be print delivery, and in step (g) the server may transmit the print subset of personalized content outputs to at least one printer for printing each of the print subset of personalized content outputs. In one embodiment, each characteristic criteria selection may include, but is not limited to: demographic data, psychographic data, or inclusion in a pre-selected group. In another embodiment, step (f) may further include the server retrieving from the database a personalization item for each consumer included in each target audience list, with each personalized content output further including a personalization feature based on the personalization item for the associated consumer. The method may further include the step of: d1) the server transmitting to each of two or more devices a total number of consumers in the target audience list. Each personalized content output may further include a data collection code associated with at least one of the content selections included in the personalized content output.

The method may further include the steps of: a1) the server receiving from a consumer device, characteristic data and contact data for a responding consumer; a2) the server saving in the database, the characteristic data and contact data associated with the responding consumer; and wherein in step (d) the responding consumer is included in at least one target audience list for which the responding consumer's characteristic data includes the characteristic criteria selection of the associated content selection and for which the responding consumer's contact data includes a location indicator matching the geographic criteria selection of the associated content selection. Alternatively, the method may further include the steps of: a1) the server receiving from a consumer device, content preference data for a responding consumer; a2) the server saving in the database, the content preference data associated with the responding consumer; wherein in step (d) the responding consumer is included in only target audience lists associated with content selections matching the content preference data for the responding consumer; and wherein in step (f) the personalized content output associated with the responding consumer includes only content selections matching the content preference data for the responding consumer. In another embodiment, the method may further include the steps of: a1) the server receiving from a consumer device a delivery method selection for the responding consumer; a2) the server saving in the database, the delivery method selection associated with the responding consumer; wherein in step (d) the responding consumer is included in at least one target audience list; and wherein step (g) further comprises the server sending the personalized content output associated with the responding consumer to the responding consumer using the delivery method selection associated with the responding consumer.

Alternatively, the method for sending content to a target audience using a server in communication with two or more devices and a database (the database including a marketing dataset containing a list of consumers, characteristic data for each consumer, and contact data for each consumer) includes the steps of: a) the server receiving from each of two or more devices a content selection, wherein each content selection is associated with a content provider account; b) the server receiving from each of two or more devices a characteristic criteria selection associated with each content selection; c) the server receiving from each of two or more devices a geographic criteria selection associated with each content selection, wherein the characteristic criteria selection and the geographic criteria selection associated with each content selection defines a target audience selection for the associated content selection; d) the server generating a target audience list for each content selection, wherein each target audience list includes a subset of the list of consumers from the marketing dataset, wherein the characteristic data for each consumer on each content selection's target audience list includes the characteristic criteria selection of the associated content selection, and wherein the contact data for each consumer on each content selection's target audience list includes a location indicator matching the geographic criteria selection of the associated content selection; e) the server saving in the database, target audience data for each consumer in each target audience list, wherein the target audience data indicates the one or more target audience lists on which the consumer is included; f) the server generating a list of targeted households based on the contact data associated with each consumer included in each of the target audience lists, wherein each targeted household includes two or more consumers with a common item of contact data; g) the server generating a personalized household content output associated with each targeted household, wherein the personalized household content output includes the content selection associated with each of the one or more target audience lists on which the two or more consumers of the targeted household are included or the content selection associated with a subset of the one or more target audience lists on which the two or more consumers of the targeted household are included; and h) the server sending each of the personalized household content outputs to the associated targeted household. Each of the two or more devices may include a desktop computer, a laptop computer, a handheld computer, a smart phone, a smart television, a smart watch, a tablet, or any other device configured to receive a communication from the server or to send a communication to the server. The server may communicate with each device through a webpage or application, but the method is not limited to these communication methods. In one embodiment, step (g) may further include the server retrieving from the database a personalization item for each consumer included in each of the targeted households, with each personalized household content output further including a personalization feature for each consumer included in the associated targeted household based on the personalization items.

The method may further include the steps of: a1) the server receiving from a consumer device, content preference data for a responding consumer; a2) the server saving in the database, the content preference data associated with the responding consumer; wherein in step (d) the responding consumer is included in only target audience lists associated with content selections matching the content preference data for the responding consumer; and wherein in step (f) the responding consumer is included in a targeted household. In another embodiment, the method may further include the steps of: a1) the server receiving from a consumer device a delivery method selection for a responding consumer; a2) the server saving in the database, the delivery method selection for the responding consumer; wherein in step (d) the responding consumer is included in at least one target audience list; wherein in step (f) the responding consumer is included in a targeted household; and wherein step (h) further comprises the server sending the personalized household content output associated with the targeted household of the responding consumer to the responding consumer's targeted household using the delivery method selection associated with the responding consumer.

In another alternate embodiment, the method for sending content to a target audience may use a server in communication with two or more devices and a database, with the database including a marketing dataset and a content dataset. The marketing dataset may contain a list of consumers, characteristic data for each consumer, and contact data for each consumer. The content dataset may contain a list of content provider accounts, a list of content selections for each content provider account, and characteristic criteria selection data and geographic criteria selection data for each content selection. The method may include the steps of: a) the server receiving from a consumer device a content preference selection for a responding consumer; b) the server saving in the database, the content preference selection associated with the responding consumer; c) the server generating a target audience list for each of two or more content selections from the content dataset, wherein the target audience list includes a subset of the list of consumers from the marketing dataset, wherein the characteristic data for each consumer on each content selection's target audience list matches the characteristic criteria selection data of the associated content selection, and wherein the contact data for each consumer on each content selection's target audience list matches the geographic criteria selection data of the associated content selection, wherein the responding consumer is included in at least one target audience list, and wherein the responding consumer is included in only target audience lists associated with content selections matching the content preference selection for the responding consumer; d) the server saving in the database, target audience data for each consumer included in each target audience list, wherein the target audience data indicates the one or more target audience lists on which the consumer is included, and wherein the target audience data for the responding consumer indicates the at least one target audience list on which the responding consumer is included; e) the server generating a personalized content output associated with each consumer included in each of the target audience lists based on the target audience data, wherein the personalized content output includes the content selection associated with each of the one or more target audience lists on which the consumer is included or the content selection associated with a subset of the one or more target audience lists on which the consumer is included, wherein the personalized content output associated with the responding consumer includes the content selection associated with the at least one target audience list on which the responding consumer is included, and wherein the personalized content output associated with the responding consumer includes only content selections matching the content preference selection for the responding consumer; and f) the server sending each of the personalized content outputs to the associated consumer, wherein the server sends the personalized content output associated with the responding consumer to the responding consumer.

The method may further include the steps of: a1) the server receiving from a consumer device a delivery method selection for the responding consumer; b1) the server saving on the database, the delivery method selection associated with the responding consumer; wherein step (f) further comprises the server sending the personalized content output associated with the responding consumer using the delivery method selection associated with the responding consumer. Alternatively, the method may further include the steps of: a1) the server receiving from a consumer device, characteristic data and contact data for the responding consumer; and b1) the server saving on the database, the characteristic data and contact data associated with the responding consumer. In another embodiment, step (e) may further include the server retrieving from the database a personalization item for each consumer included in each target audience list, and wherein each personalized content output further includes a personalization feature based on the personalization item for the associated consumer.

In one embodiment, each personalized content output generated in step (e) further includes a data collection code associated with at least one of the content selections included in the personalized content output and associated with the associated consumer. The method may further include the steps of: g) the server receiving from a consumer device a first data collection code associated with the responding consumer, wherein the personalized content output sent to the responding consumer included the first data collection code; h) the server saving in the database, analytic data associated with the responding consumer based on the first data collection code, wherein the analytic data includes an indication of the one or more content selections included in the personalized content output sent to the responding consumer. Alternatively, in step (a) the server receives from the consumer device the content preference selection for the responding consumer using a first data collection code associated with the responding consumer.

DETAILED DESCRIPTION OF THE INVENTION

Figure 1:
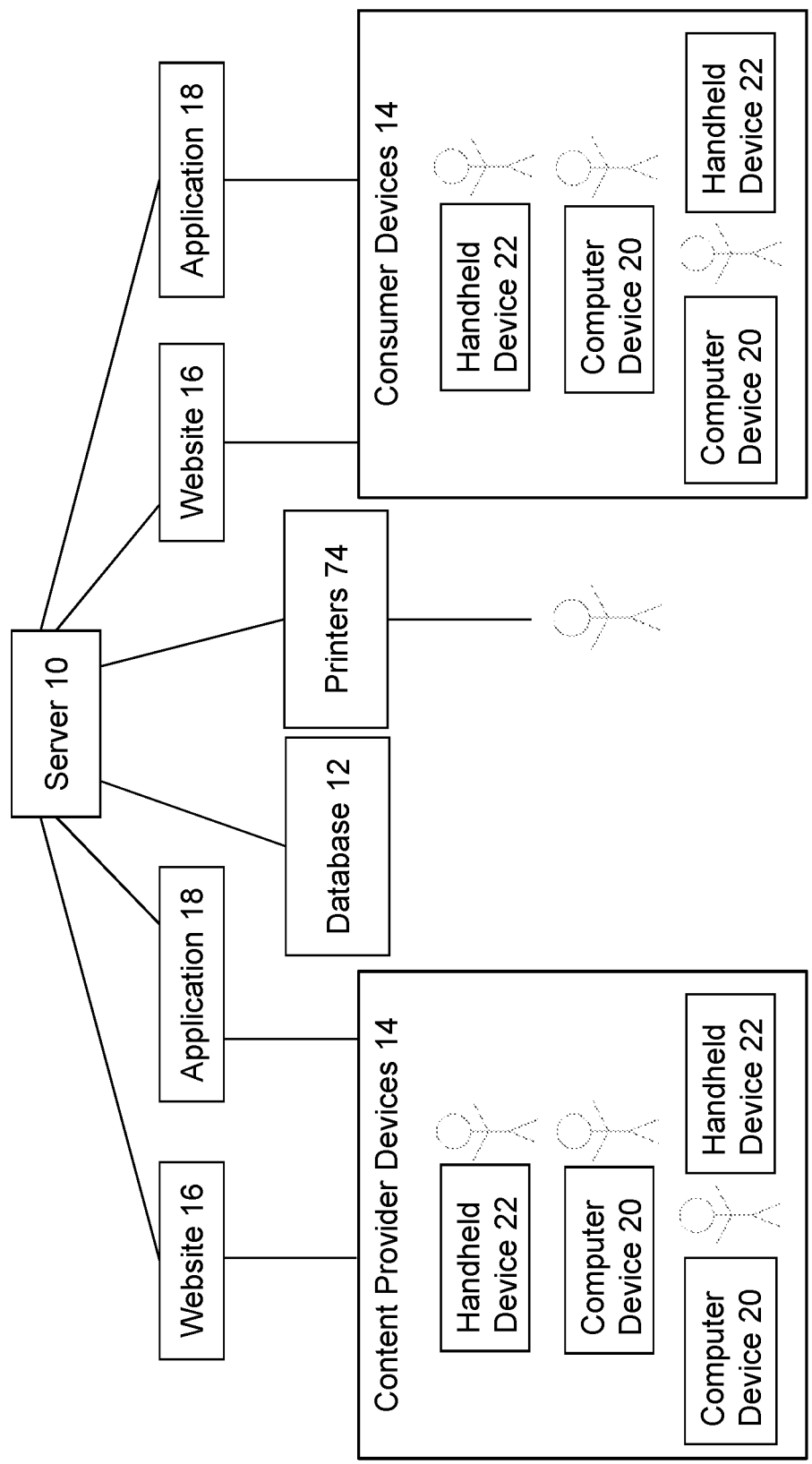
FIG. 1 is a schematic view of the communication pathways of a content delivery system.

Content providers can spend thousands of dollars to send digital and/or print content to consumers. Without any targeting, the content may be discarded by many recipients. The conventional method of sending content to consumers includes delivery of print content, such as by mail. Sending content directly to each consumer on a list (e.g., direct mail) involves a relatively high delivery cost (e.g., postage). With certain delivery modes, the delivery cost may be reduced if the content is sent to all households within a zip code or other geographic designation (e.g., shared mail). While this method reduces the delivery cost, the content may be sent to many consumers within the geographic designation who are not interested in the content. Content providers also send content through digital delivery modes, such as email. Sending the same content to a consumer in print form and digital form has proven to be more effective than using either delivery mode alone. Accordingly, many content providers send the same content to the same consumers in both ways.

FIGS. 1-5 illustrate a more cost-efficient method for sending content from a content provider to a target audience, who is more likely to be receptive to the content. The content may include, but is not limited to, advertisements. The method allows for the automated distribution of content to target audiences. The method may include sending the content to the target audience through physical delivery, digital delivery, or both. The method may include automated personalization of a content output for each member of the target audience. In some embodiments, the target audience includes consumers. As used herein, "consumers" include potential and actual purchasers of any goods or services, including but not limited to the goods and services provided by the content provider, including individuals of any age. The method may include sending content from multiple content providers to individuals who meet characteristics that are preselected by the content providers. The method may also include sending content from multiple content providers to a household in a personalized household content output, which includes content from one content provider directed to one household member and content from a second content provider directed to a second household member. In one embodiment, the method includes the use of data collection codes on the content. As used herein, data collection code refers to a bar code, an alphanumeric code, or any other unique identification symbol included on content outputs received by consumers.

In a further embodiment, the method includes analysis of data collection codes and other consumer interactions. The method may further include analysis of the data collected from the data collection codes and other consumer interactions, and the generation of a report for the content providers including the data and/or analysis of the data collected. In one embodiment, the method further includes using the data collected from the data collection codes and other consumer interactions to select the content included in each personalized content output for a consumer or a household (i.e., behavior learning based on consumer activities and interactions).

The method includes a server receiving information from a device. In some embodiments, the device is operated by a content provider such as a merchant, a service provider, or other individual or entity wishing to distribute content. The content to be distributed may include, but is not limited to, advertisements, coupons, offers, or other promotional materials. In this embodiment, the server receives information related to the content to be distributed, the target audience, or any other types of information received by server from content provider device. In other embodiments, the device is operated by a consumer, and the server receives information related to the consumer and/or other members of the consumer's household and content of interest for the consumer or other members of the consumer's household. In still another embodiment, the method includes a rewards or incentive program that encourages consumer interaction.

FIG. 1 illustrates communication pathways of server 10 in communication with at least one database 12 and at least one device 14. Each device 14 includes an electronic display. The server 10 communicates with devices 14 over the internet or any other digital network using website 16 or application 18. The server 10 communicates with database 12 through the internet or other digital connection, including, but not limited to, a local area network (LAN). In one embodiment, the server 10 includes the database 12. In other embodiments, database 12 is located on a machine other than server 10. In still other embodiments, database 12 is located on one or more cloud-based servers.

Each of devices 14 may be a computer device 20 (such as a desktop or laptop computer) or a handheld device 22. Content providers and consumers may use any combination of computer devices 20 and handheld devices 22 as illustrated in FIG. 1. Handheld device 22 can be any handheld device capable of interacting with website 16 or application 18, including but not limited to a handheld computer, smart phone, smart television, smart watch, tablet, or any other device configured to receive a communication from the server. A user may access the server 10 through a website 16 using device 14. Web site 16 may have a user interface. Website 16 may include a different user interface for different types of user accounts. In one embodiment, website 16 includes a content provider interface for a user account associated with a content provider and a consumer interface for a user account associated with a consumer, with the content provider interface including different features than the consumer interface. For example, the content provider interface includes a workflow wizard that allows the content provider to easily choose options for the design of the content, layout of the content, method of sending the content, and/or a target audience for the content. The same or other users may access the server 10 through an application 18 having an interface using device 14. Application 18 may include content provider interface for a user account associated with a content provider and a consumer interface for a user account associated with a consumer, with the content provider interface including different features than the consumer interface. In some embodiments, the content provider interface includes a workflow wizard that allows the content provider to easily choose options for the design of the content, layout of the content, method of sending the content, and/or a target audience for the content. The application 18 may be a software application capable of being run on a handheld device 22 or laptop or desktop computer 20. In another embodiment, application 18 may be a software application capable of being run through a web browser and can be accessed using either desktop or laptop 20 or handheld device 22.

The method includes at least one device 14 communicating with the server 10. Device 14 is operated by a user. The user may be required to set up a user account. In some embodiments, the options and information associated with a user account is different for user accounts associated with content providers than for user accounts associated with consumers. In some embodiments, the content provider user account allows the content provider to save content, manage the target audience, delivery methods, delivery dates, or other features of content through the user account. In a further embodiment, the content provider can save content that has been sent to a target audience for future reference (for example, content related to a specific holiday can be saved and retrieved and/or reused at the next holiday occurrence). The content provider can be an individual or business entity that is interested in sending content to a target audience. In some embodiments, the content provider is a merchant, a provider of services, or other individual or entity wishing to distribute an advertisement. In some embodiments, the content to be delivered is an advertisement, coupon, offer, or other promotional materials. In some embodiments, the target audience includes consumers.

In some embodiments, device 14 is operated by a consumer interested in customizing content received by the consumer. The consumer may be an individual or entity that has received content from a content provider. In other embodiments, the consumer is an individual or entity that wishes to receive content from at least one content provider. In some embodiments, the consumer is able to customize the consumer's preferences and interactions with other users (whether those users are content providers or other consumers) through their consumer account. The consumer may also provide demographic information and/or psychographic information about themselves that can be used to provide targeted content to the consumer. The demographic and/or psychographic information may be associated with the consumer when the consumer participates in surveys. The surveys may be interactive.

Figure 2:
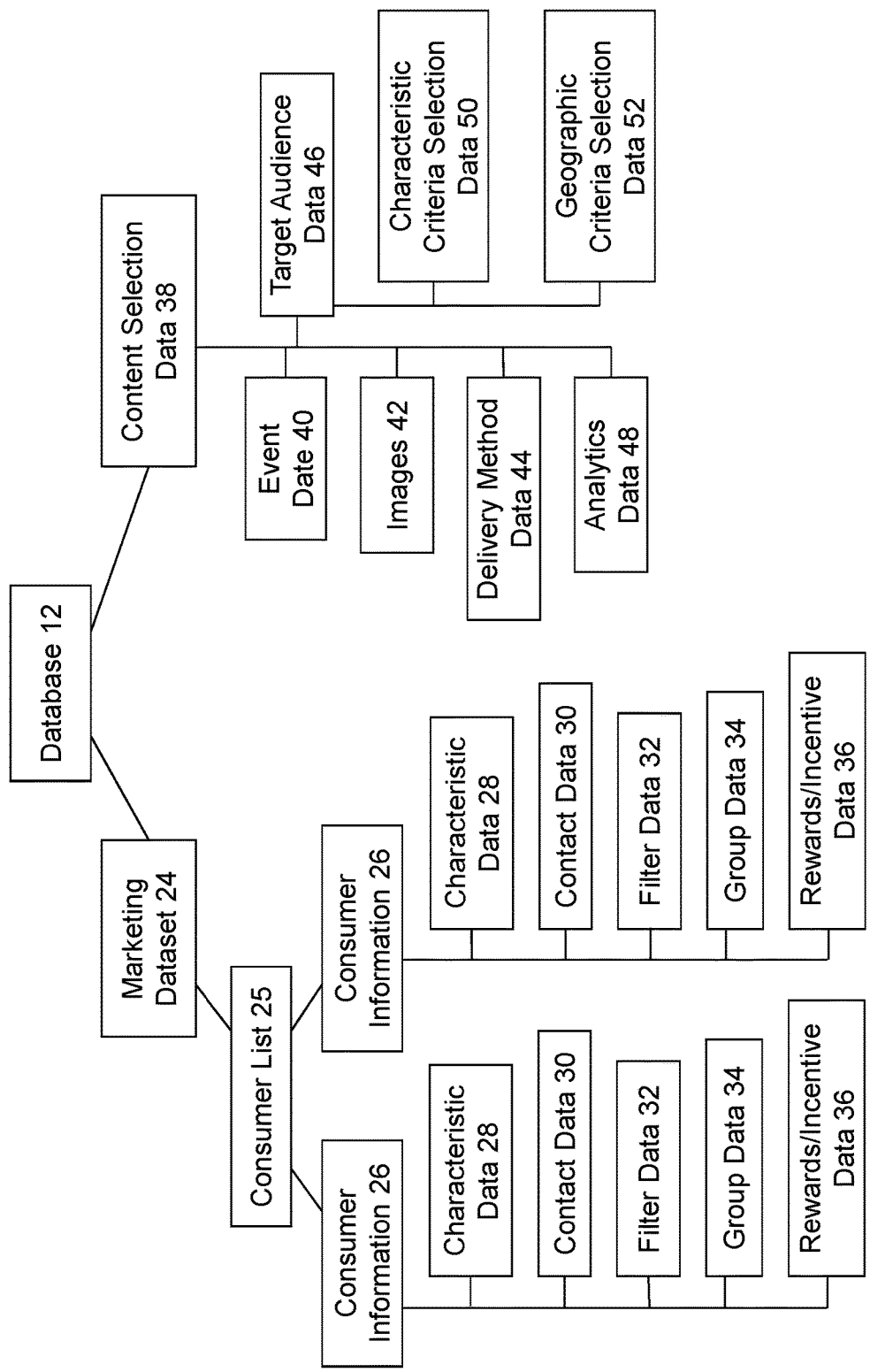
FIG. 2 is a schematic view of a database of the content delivery system.

Referring now to FIG. 2, database 12 can be a database server. In one embodiment database 12 includes a marketing dataset 24. Marketing dataset 24 includes consumer list 25 and consumer information 26 for each consumer included in consumer list 25. The consumer information 26 includes characteristic data 28 and contact data 30 for each consumer included in the marketing dataset 24. Non-limiting examples of at characteristic data 28 include: demographic information, psychographic information, and inclusion in a list. Demographic information includes information about consumer's background and legal status. Demographic information includes, but is not limited to, vital statistics (such as birth dates, age, gender), legal status (marriage, divorce, registration of a place of residence), census information (information regarding household members), education, employment status, occupation, language(s), religion, nationality, ethnicity, and race. Psychographic information includes information regarding a consumer's interests, values, and beliefs. Non-limiting examples of psychographic information include: habits, hobbies, values, personality traits, lifestyles, opinions, attitudes, interests, loyalty, preferred shopping methods, motivations, and personal goals. In some embodiments, the demographic and/or psychographic information is obtained from the consumer. In other embodiments, the demographic and/or the psychographic information is obtained from purchased data. In still further embodiments, the demographic and/or psychographic information is obtained from captured data. As used herein, captured data includes, but is not limited to, any data received by the server related to a consumer, including data collected directly or indirectly from consumers or consumer activities, and including data collected from content providers related to consumer activities or preferences. In one embodiment, captured data is data generated from data collection codes on delivered content. The list may be a list obtained from a content provider. In other embodiments, captured data is generated from interactive surveys. Non-limiting examples of lists from which consumer information 26 is obtained are: lists of consumers who have previously purchased from a content provider, lists of consumers who frequently purchase goods or services from a content provider, lists of consumers who have purchased goods or services from the content provider with no purchases in a certain period of time, lists of consumers who recently moved into a certain geographic area, and lists of consumer birthdays.

The consumer information 26 also includes contact data 30 associated with each individual consumer. The contact data 30 is any information that can be used to contact the individual consumer. Non-limiting examples of contact data 30 include: a home address, a work address, a school address, an email address, a land-line phone number, a cellular phone number, a facsimile number, cookies stored on the consumer's device 14, an IP address, or a device identification.

In one embodiment, consumer information 26 includes filter data 32. Filter data is data associated with a consumer's filters. In one embodiment, a consumer can create filters so that the consumer will receive only certain types of offers (such as offers for household goods or pet products), offers from certain content providers, offers for certain brands, and/or offers for certain products or services (such as offers for power tools or salon services).

In another embodiment, consumer information 26 includes group data 34. Group data 34 is data regarding which groups to which a consumer belongs. Groups can be created by content providers and/or consumers. Groups allow content providers and/or consumers to exchange information regarding certain brands, products, services, types of products, types of services, etc. In some embodiments, consumers are able to interact with other consumers and/or the content provider through the group. In some embodiments, content providers are able to post content to groups to solicit feedback from consumers regarding the content. In some embodiments, content providers can invite consumers with certain characteristics to join a group. In other embodiments, consumers can select which groups they wish to join. In still another embodiment, consumers will only be shown groups for which the content provider has associated with a characteristic that is also associated with the consumer.

In another embodiment, consumer information 26 includes rewards/incentive data 36. Rewards/incentive data 36 is data associated with the rewards or incentives that a particular consumer has earned or received. In one embodiment, if a consumer engages in a predetermined number of interactions through the website or application, or if the consumer redeems a predetermined number of offers from the content (based on analytical data received from data collection codes on content outputs), the consumer will receive a reward or incentive. An interaction through the website can include, but is not limited to: opening an account, selecting a preferred delivery method, updating contact information, creating content filters, adding/modifying demographic or psychographic information, browsing content, sharing content with other consumers or through other outlets, such as social media, creating shopping lists, creating/joining a group, subscribing/following a content provider, interacting with a content provider, voting on content, and purchasing a product or service. These rewards or incentives may be from the owner/administrator of the website, a user, a group in which the consumer participates in, or a specific brand. In some embodiments, the rewards/incentives are quantified using a point system and once a consumer earns points for at least some interactions. The points earned for an interaction can be based on the type of interaction, the identity of the content provider with which the consumer is interacting, and/or the value of a good or service. In a further embodiment, multiple tiers and status levels are associated with a pre-determined point total. In a still further embodiment, once a consumer reaches a certain status, such as Platinum Status, the consumer can then redeem their earned points. In yet a further embodiment, the consumer can use the points towards the purchase of goods or services. In yet another embodiment, the method includes providing a custom website for redemption of rewards and incentives. In a further embodiment, the custom website for reward/incentive redemption includes goods and/or services which the consumer can purchase at least partially through redemption of their earned rewards/incentives.

In one embodiment, database 12 also includes content selection data 38. Content selection data 38 includes event date 40, images 42, delivery method data 44, target audience data 46, and analytics data 48 for content. The event date 40 is the date on which the content is to be sent to the target audience. Images 42 are the images/graphics/photographs that are to be included with the content when the content is sent to the target audience. In one embodiment, images 42 are provided by the content provider. In other embodiments, the content provider selects images 42 from image files, photographs, and illustrations already in the database 12. The delivery method data 44 includes all of the methods of delivery with which the content provider would like the content sent to the target audience. In one embodiment, the user may select only one delivery method. In another embodiment, the user may select multiple methods of delivery. In a further embodiment, the content is sent to at least one consumer falling within the target audience based on the consumer's indicated preferred delivery method.

The delivery method can be physical or digital delivery. Methods of delivery include, but are not limited to: sending through a physical delivery system (United States Postal Service, other postal service, a courier or courier service, etc.), sending an email, sending a text or other message to a cellular phone number or any other device capable of receiving digital messages or advertisements, sending a facsimile number, displays on websites or applications, and application pushes. In one embodiment, the delivery method may include a display on a third-party website through use of cookies.

In another embodiment, the delivery method may include a content display on a website associated with the server. In this embodiment, the website display may include dynamic content, which may be designed to draw attention to the content provider and the content selection. The server may notify consumers who access the website that dynamic content is pending for a time period leading up to an event time. At a predetermined time set by the content provider, the dynamic content may become active, which may include a countdown in value increments and/or a dynamic change to enable a threshold number of consumers to be reached. For example, the dynamic content may state, "The first five people to click on the offer will receive a $30 discount. The next 100 people to click on the offer will receive a $15 discount." The countdown may be based on time, number of redemptions by consumers, or both, as selected by the content provider. If the content selection is an advertisement, the dynamic content may be referred to as a Dynamic Coupon™.

The target audience data 46 identifies the members of a target audience for content. Target audience data 46 includes characteristic selection(s) data 50 and geographic selection(s) data 52. The target audience is a subset of consumer list 25, with each consumer in the target audience having contact data 30 associated with a specific geographic area and characteristic data 28 selected by the content provider. Characteristic selection data 50 includes at least one characteristic that the content provider selects to be associated with a target audience for the content. The characteristic selection data 50 includes a selection of at least one characteristic. Non-limiting examples of the characteristic include: demographic information, psychographic information, and inclusion in a list. Demographic information includes information about consumer's background and legal status. Demographic information includes, but is not limited to, vital statistics (such as birth dates, age, gender), legal status (marriage, divorce, registration of a place of residence), census information (information regarding household members), education, employment status, occupation, language(s), religion, nationality, ethnicity, and race. Psychographic information includes information regarding a consumer's interests, values, and beliefs. Non-limiting examples of psychographic information include: habits, hobbies, values, personality traits, lifestyles, opinions, attitudes, interests, loyalty, preferred shopping methods, motivations, and personal goals. In some embodiments, the demographic and/or psychographic information is obtained from the consumer. In other embodiments, the demographic and/or the psychographic information is obtained from purchased data. In still further embodiments, the demographic and/or psychographic information is obtained from captured data. In one embodiment, captured data is data generated from the data collection codes on delivered content. The list may be a list obtained from a content provider. In other embodiments, captured data is generated from interactive surveys. Non-limiting examples of lists a user may use are: lists of consumers who have previously purchased from the content provider, lists of potential customers who frequently purchase from the content provider, lists of potential customers who used to purchase from the content provider but have not done so in a certain period of time, lists of potential customers who recently moved into a certain geographic area, and lists of potential customer's birthdays.

Geographic selection data 52 is information that defines a geographic area in which the content is to be delivered. In one embodiment, the method includes a custom mapping tool, which allows the content provider to select a geographic area and the custom mapping tool then provides to the content provider a real-time count for the number of consumers in the consumer list 25 whose contact data 30 is within the geographic area selected. In a further embodiment, the custom mapping tool provides to the content provider a real-time count of the number of consumers in the target audience (i.e., the number of consumers including a characteristic criteria selection) in the selected geographic area. The content provider can then modify the selected geographic area and/or the characteristic selection data 50 so that the target audience meets a threshold number of consumers or households. In one embodiment, the custom mapping tool includes an application. Each content provider may further define the selected geographic area as its own Custom Trade Zone™ for delivery of content. The Custom Trade Zone™ may incorporate data variables, consumer trends, and other relevant data. The server may facilitate the process of defining, storing, and later accessing or modifying the Custom Trade Zone™ for each content provider.

The analytics data 48 is data associated with consumers' redemption or interaction with content. In one embodiment, analytics data 48 includes information relating to consumers' use of content through analyzing information from the data collection code included in the content. In one embodiment, the data collection code is a bar code or any other unique identification symbol. Acceptable bar codes include, but are not limited to, a quick response code ("QR code") or GS1 code (Global Standards One). Acceptable unique identification symbols include, but are not limited to, alphanumeric codes. Analytics data 48 can include information regarding the number of consumers who used the content to purchase goods/services, the locations that goods/services were purchased using the content, the total amount of the purchase, the date and/or time of the purchase, the identity of consumers and/or households that used the content to purchase goods/services, how long a consumer browsed a website, the products/services viewed by a consumer on a website, the click-through-rate for content, the number of PURL (persistent URL) landing pages visited after using the content to make a purchase, and the effectiveness of a drip marketing campaign. Drip marketing campaigns include the sending of pre-determined content upon the occurrence of an event. The event can be the passage of time, the purchase of a good/service by a consumer, the status of a consumer, and/or the actions or inactions of a consumer. Non-limiting examples of drip marketing campaigns include delivering specific content to every consumer who has a birthday in the month of May, or delivering specific content, such as content offering a discount on purchases, to all consumers who have not purchased a good/service from the content provider in the last 3 months. The analytics data 48 can also be used to customize marketing intelligence, provide a dynamic content provider and/or consumer experience, determine the relevance of content, and/or provide other insight or reports to the content provider.

A portion of the server 10 may operate as a web server providing portal services over an Internet Service Provider (ISP) network to devices 14. Server 10 may also operate as an application server, a database server, a print server, and any number of other servers performing functions described herein. Server 10 may include one or more computers or other computing devices. Server 10 may use common computing and communication technology to perform the function of relaying and/or receiving content to an ISP network or to other networks. The steps of the methods described herein are intended for operation as software programs running on a computer processor of server 10.

Figure 3:
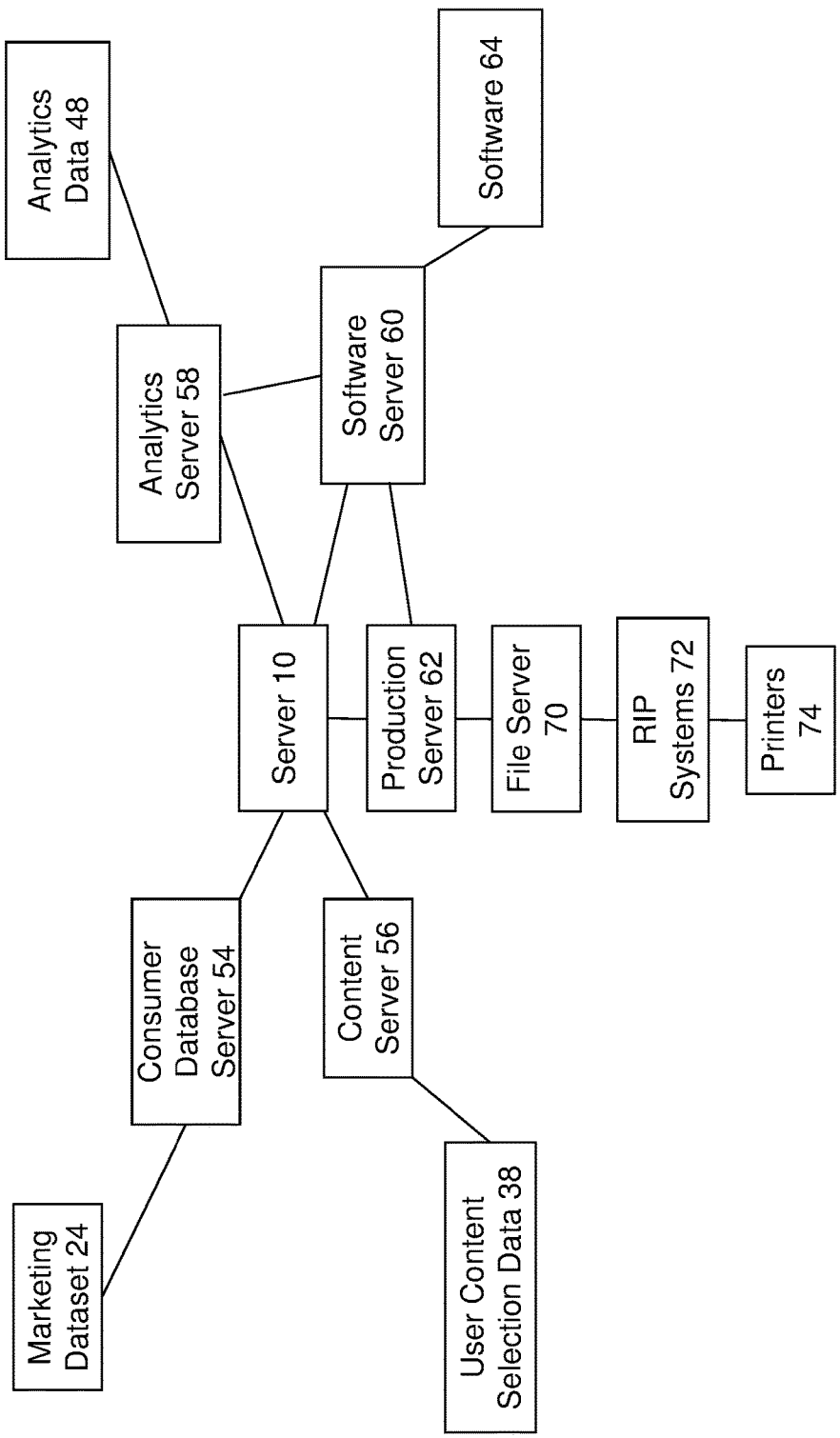
FIG. 3 is a schematic view of alternate communication pathways of the content delivery system.

In the embodiment shown in FIG. 3, server 10 is in communication with consumer database server 54, content server 56, analytics server 58, software server 60, and production server 62. Consumer database server 54 includes the marketing dataset 24. The content server 56 includes the user content selection data 38. Analytics server 58 includes analytics data 48. Software server 60 includes software 64 for the functions performed in the method. Production server 62 can be in communication with file server 70, which can be in communication with rip systems 72 and printers 74.

The software 64 includes computer code for performing functions included in the method. In one embodiment, software 64 can be application software. Software 64 includes but is not limited to: computer code for the operation of the workflow wizard that a content provider can use to organize content, delivery options, and a target audience; a mapping tool for selecting geographic selection data 52 and determining a target audience size based on the geographic selection data 52; computer code, queries, and scripts for filtering characteristic selection data 50 and providing the number of consumers who meet the characteristic selection data 50; computer code for accessing image files, photos, and illustrations to create graphics for content; computer code for processing analytics data 48; computer code, algorithms, and rules to send the most relevant content to consumers; computer code to process, prioritize, and compile content; computer code for processing variable print output and high volume printing; computer code for digital delivery of content; computer code for digitally ripping files which include content for delivery.

The production server 62 can process, prioritize, and compile content. In one embodiment, the production server 62 includes computer code with business rules and algorithms that can assign the most relevant content to each consumer and/or household within a geographic area selected by the content provider. In one embodiment, the production server 62 accesses software 64 on the software server 60 to assist in processing, prioritizing, and compiling content. In another embodiment, the production server 62 processes single content provider direct mail, email, or digital content, multiple content provider mail or digital content, and variable-data mail or digital content. Variable-data mail or digital content contains different content for different consumers and/or households and the software 64, applications, and/or services include computer code that selects which content will be included on the variable-data mail or digital content for each different consumer and/or household. In another embodiment, the production server 62 allows the print process and digital processing to occur simultaneously.

The production server 62 produces print-ready files, which are stored on the file server 70. The print-ready files are then sent to the digital rip (raster image processor) system 72 to process the files. The digital rip system 72 creates optimized print-ready files formatted unique to the printer type to which the file will be sent. Then, the file server 70 sends the formatted print-ready files to one or more printers 74 for printing. In one embodiment, the printers 74 are high-speed digital printers.

Figure 4:
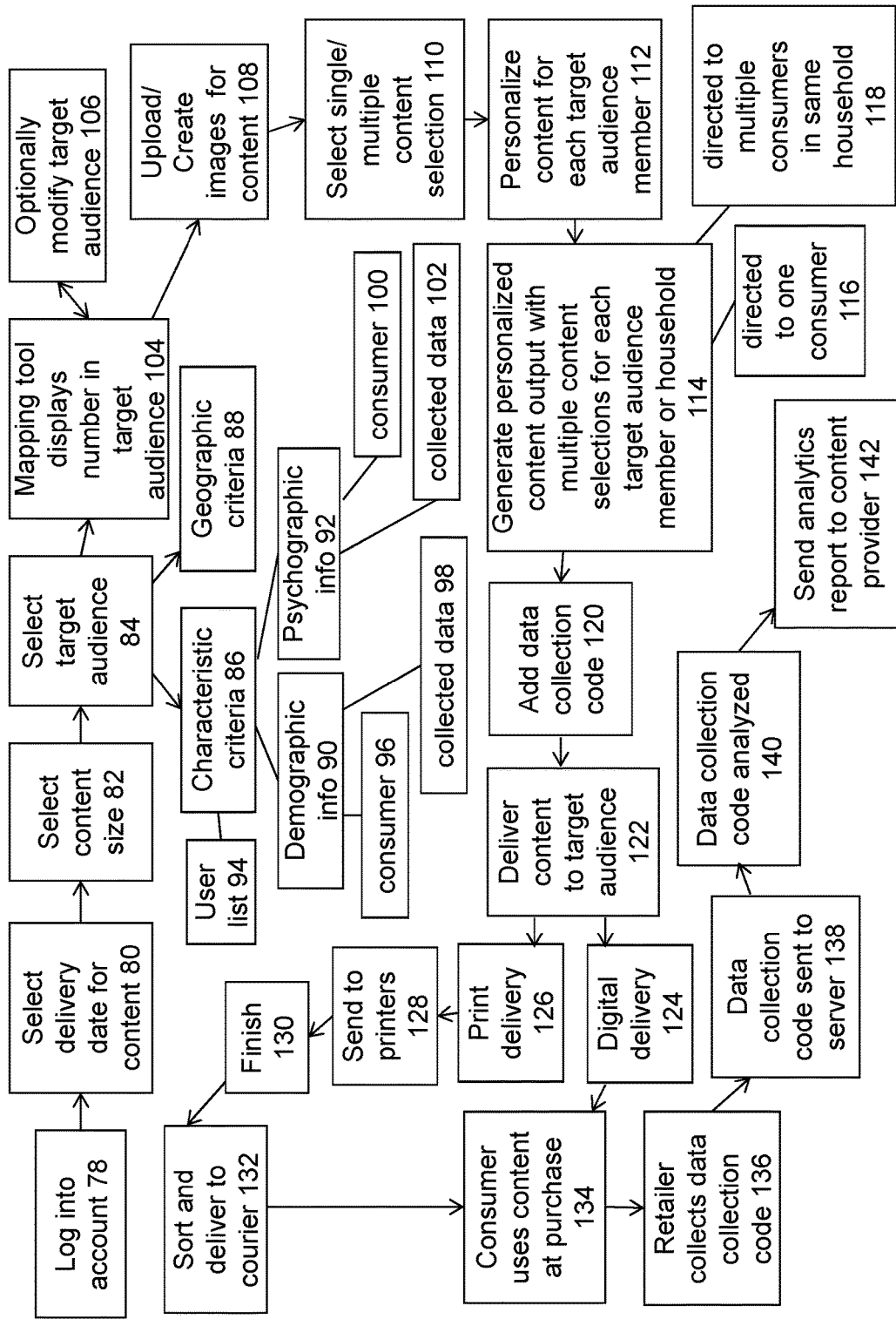
FIG. 4 is a flow chart of the internet-based process for customizing content and selecting a target audience.

FIG. 4 illustrates one embodiment of a method of sending content to a target audience. First, the user, a content provider, logs into their user account, as shown at 78. The content provider then selects customizations for content to be delivered to a target audience. The customizations may be included in a workflow wizard. The content provider selects a date for delivery of the content to a target audience, as shown at 80. The content provider also selects the content size, as shown at 82. The content size may vary. In another embodiment, the content size is based on a file size (for example, 1 megabyte) instead of a physical size. In yet another embodiment, the content size can be based on the delivery method. For example, the content output may be sized to be viewed on a handheld device 22, a desktop or laptop device 20, a smart phone, a smart television, a smart watch, a tablet, or any other device configured to receive a communication from the server. The content provider also selects the target audience for the content, as shown at 84. The content provider selects the target audience by choosing at least one consumer characteristic and a geographic area, as shown at 86, 88. The consumer characteristic can be demographic information, psychographic information, or user list information, as shown at 90, 92, and 94. The demographic information can be information that was received from the consumer, as shown at 96, or from collected data, as shown at 98, or both. The psychographic information can be information that was received from the consumer, as shown at 100, or from collected data, as shown at 102, or both. Once the target audience has been selected, a mapping tool calculates and informs the content provider the number of members of the target audience, as shown at 104. The number of members of the target audience can be the number of consumers in the target audience or the number of households in the target audience. As shown at 106, the content provider can modify the target audience by either changing the geographic area or the consumer characteristic selections. If the content provider modifies the target audience, the mapping tool calculates and informs the content provider of the number of members of the target audience using the revised information. The content provider also either creates or uploads graphics and images 42 to be included in the content, as shown at 108. The images can be uploaded by the content provider. In one embodiment, the images uploaded by the content provider are associated with the content provider's user account and are not available for use by other content providers. In another embodiment, uploaded content is available for use by other content providers. In still another embodiment, the content provider chooses from images 42 located in the database 12. The content provider also selects whether the content sent to the target audience will include only the content provider's content selection (where only content from one content provider is sent to members of the target audience) or if the content sent to the target audience will include content selections from more than one content provider (where content from more than one content provider is sent to consumers that meet each content provider's selected target audience), as shown at 110.

Still referring to FIG. 4, the system then uses software 64 to personalize the content for each target audience member, as shown at 112. For content that includes content selections from more than one content provider, software 64 generates a personalized content output (whether content for physical delivery or for digital delivery) for each member of the target audience, as shown at 114. While some content may be the same for multiple members of the target audience, other content will be different for some members of the target audience based on the consumer characteristic(s) selected by each content provider whose content is included in the piece). The personalized content output can include content from multiple content providers with all content selections directed to one consumer, as shown at 116 and in FIGS. 6A, 6B, 7A, and 7B. The personalized content output can include content from multiple content providers with some content being targeted to one member of a household and other content targeted to another member of the same household, as shown at 118 and in FIGS. 8A and 8B. A data collection code can be added to the content, as shown at 120. In one embodiment, the personalized content output may include a separate data collection code for each content selection from each content provider. In another embodiment, the personalized content output includes only one data collection code for all content selections included on the personalized content output.

The step of generating the personalized content output may further optionally include prioritizing among multiple content providers for inclusion on the personalized content output when the consumer or household is within the target audience for more content providers than the available spaces on the personalized content output. In other words, if the number of target audiences within which the consumer falls exceeds a maximum number of spaces for content selections on a content output (e.g., 4, 8, 13, or any other number of spaces), the method may further include prioritizing among the content selections associated with the target audiences to choose the content selections to include in the content output. For example, if a consumer falls within the target audience for 10 content selections and the content output format includes only 8 spaces for content selections, the server may choose 8 of the 10 content selections to include on this consumer's personalized content output. The choice of content selections may be based on priority data, which may include target dates and other criteria. In one embodiment, this is referred to as a No Match™ condition. The content selections that were not included in the consumer's personalized content output may be delivered to the consumer by another delivery method, such as email, digital display, or any other delivery method described herein.

The personalized content output is then processed for delivery to the target audience, as shown at 122. For digital delivery content, software 64 sends the content to members of the target audience, as shown at 124. For print delivery 126, the content is processed and sent to printers 128. As discussed above, processing can include sending the files for printing through a rip system 72. After printing, the content is finished, as shown at 130. The finishing process can include trimming the printed content output and processing the content output to allow for the handling of high volume, walk sequence, variable print mail. The printed content output is then sorted and delivered to a physical delivery service, as shown at 132. The physical delivery service may be the United States Postal Service, a courier service, a private delivery service, or other physical delivery service.

FIG. 4 shows that for both digitally delivered content and for printed content, a consumer who receives the content can then use the content to view and/or purchase goods or services, as shown at 134. As part of the viewing and/or purchasing process, the retailer/service provider collects the data collection code, as shown at 136. If the data collection code is a bar code, then the collection can be through scanning the bar code. The data collection code information is then sent to the server, as shown at 138. The collected data from the data collection code is then analyzed using computer code, as shown at 140. After data analysis, an analytics report can be sent to the content provider(s), as shown at 142.

The method may include the steps disclosed herein and/or the steps illustrated in FIG. 4 in any sequence and in any combination, including the absence of certain disclosed or illustrated steps.

Figure 5:
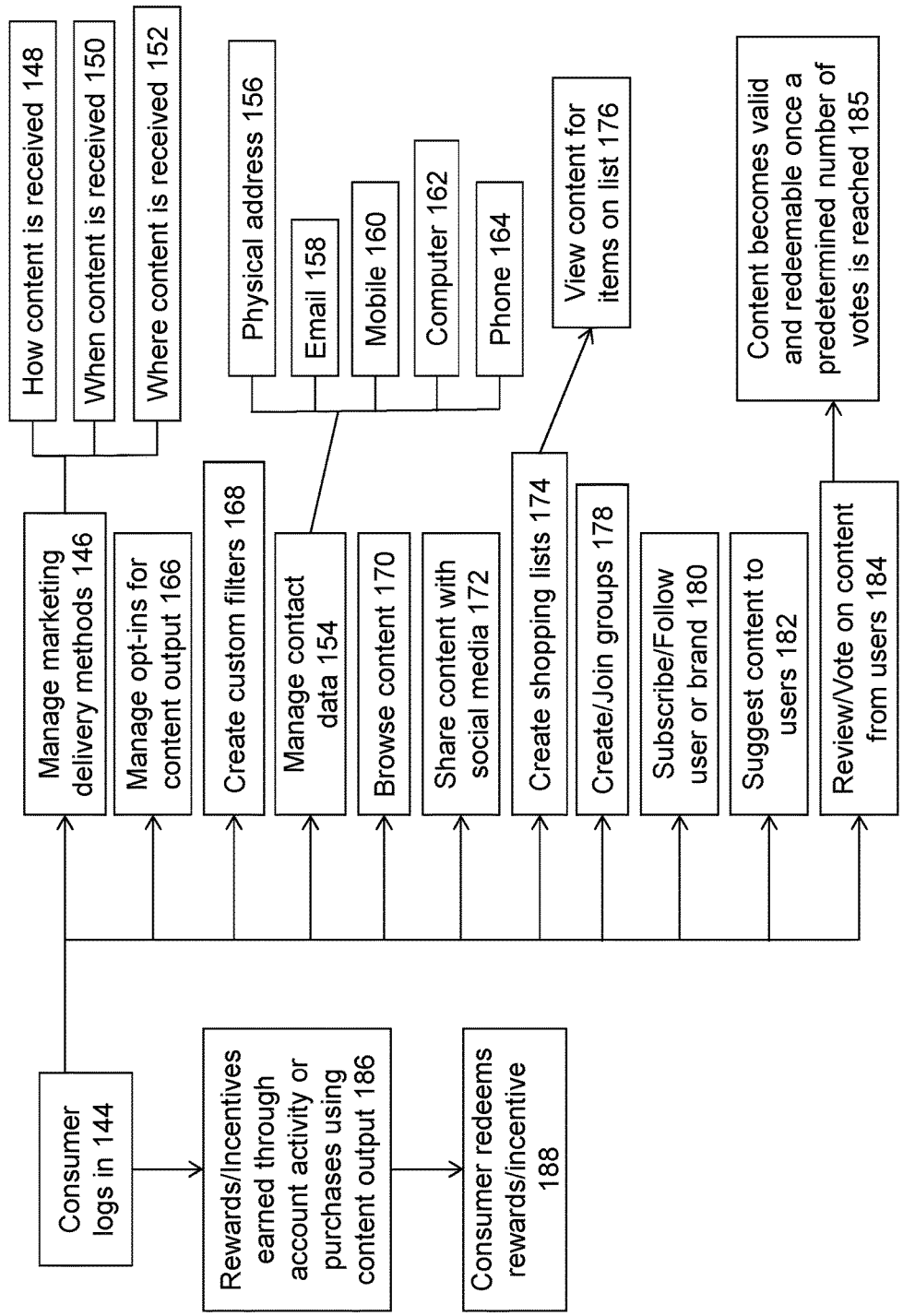
FIG. 5 is a flow chart of the internet-based process for consumers to interact with the content delivery system.

FIG. 5 illustrates a consumer's possible interactions with server 10. As shown at 144, the consumer logs in to their account. Once logged in to their account, the consumer can manage and select content delivery methods, as shown at 146. This can include selecting a preferred delivery method (email, text, digital display, application push, physical delivery, fax, etc.), as shown at 148, when the consumer receives content (holidays, birthdays, time of day, days of the week, etc.), as shown at 150, and/or where the consumer receives content (work, home, etc.), as shown at 152.

Still referring to FIG. 5, the consumer can also manage their contact data, as shown at 154. The consumer can update their physical address, as shown at 156, their email address, as shown at 158, their cell phone number, as shown at 160, their IP address, as shown at 162, or phone number, as shown at 164.

Further referring to FIG. 5, the consumer can also manage opt-ins for content, as shown at 166. The consumer can select whether they are open to receiving content or whether they would prefer not to receive content.

Also shown in FIG. 5, the consumer can create custom filters 168. The custom filters can be set so that the consumer will see only certain types of content providers (such as content for wholesalers), content from certain content providers, content for certain brands, and/or content for certain products or services (such as offers for power tools or salon services).

Still referring to FIG. 5, the consumer can browse available content while logged in to their account, as shown at 170. In one embodiment, the website 16 or application 18 includes content from at least one content provider that can be viewed by a consumer through the website 16 or application 18. In a further embodiment, the content is a coupon and the consumer can use or redeem the coupon to purchase an item or service. In a still further embodiment, the purchase of the item or service can be performed through web site 16 or application 18. In an alternate embodiment, the purchase of the item or service is through the content provider or other third party website which is linked to the website 16 or application 18.

Consumers can also interact with other consumers and content providers through social media, as shown at 172. In this embodiment, a consumer can share content through their social media account(s) through the website 16 or application 18. In another embodiment, website 16 or application 18 includes links to social media accounts of content providers, which consumers can use to be directed to the social media page associated with a particular content provider.

Consumers can also create shopping lists, as shown at 174. In one embodiment, as shown at 176, the consumer can create a shopping list and software 64 then presents the consumer with content related to at least one item on their shopping list. In another embodiment, software 64 can present the consumer with content from one content provider relating to more than one item on their shopping list. In still another embodiment, software 64 can present the consumer with content from more than one content provider for items on their shopping list.

As shown at 178, consumers can either create or join at least one group. Groups can be created by content providers and/or consumers. Groups allow content providers and/or consumers to exchange information regarding certain brands, products, services, types of products, types of services, etc. In some embodiments, consumers are able to interact with other consumers and/or the content provider through the group. In some embodiments, content providers are able to post content to groups to solicit feedback from consumers regarding the content. In some embodiments, content providers can invite consumers with certain characteristics to join a group. In other embodiments, consumers can select which groups they wish to join. In still another embodiment, consumers will only be shown groups for which the content provider has associated with a characteristic that is also associated with the consumer.

Consumers can subscribe or follow another user (whether a content provider or another consumer), as shown at 180. In an alternate embodiment, the consumer can subscribe or follow a brand. Once the consumer subscribes to or follows the user/brand, software 64 presents content that the user/brand has shared. In another embodiment, the consumer subscribes to or follows a content provider and the consumer is able to view content from that content provider.

Consumers can also suggest content to other users, whether content providers or consumers, as shown at 182. In one embodiment, consumers are able to suggest content to other consumers. In another embodiment, consumers can provide suggestions to content providers regarding content that the consumer wishes to see. For example, a consumer could suggest to a hardware store that they are interested in receiving offers for 15% off of lumber products.

As shown at 184, consumers can vote on pre-flight content from content providers. In one embodiment, the content includes an advertisement that is not yet effective, but once a pre-determined number of consumers vote that they are interested in the advertisement, the advertisement will become effective and consumers are able to use the advertisement to purchase goods/services, as shown at 185.

As shown at 186, and as discussed above, the consumer can also earn rewards and incentives by interacting through their user account or by using content to view and/or purchase goods/services. Also as described above, and as shown at 188, the user can then redeem their earned rewards and/or incentives, such as by purchasing goods or services through a rewards area located on the website 16 or application 18.

Figure 6A:
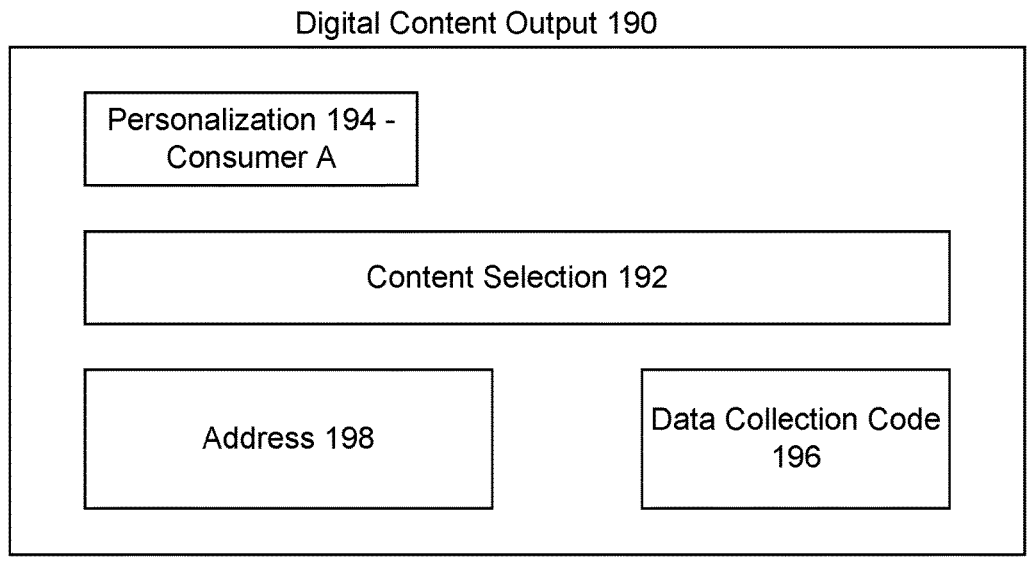
FIG. 6A is a schematic view of a personalized content output for a single advertisement for digital delivery.

FIGS. 6A-8B illustrate examples of content output that may be sent using the method disclosed herein. FIG. 6A shows digital content output 190, including content selection 192, from a single content provider that is delivered to a member of the target audience. For example, the content selection may include offers to "buy one and get one free," offers for free promotional products or services (such as a free ice cream cone or bowling game), or offers for discounted prices on products or services (such as a 20% discount or a $10 discount). Digital content output 190 includes personalization 194, which addresses the content to the specific member of the target audience. In one embodiment, personalization 194 may include the name of a consumer, such as Consumer A. Digital content output 190 includes data collection code 196 and an address 198 where the content selection 192, such as an offer to buy one get one free, can be redeemed. Data collection code 196 may be a bar code intended for scanning or an alphanumeric code.

Figure 6B:
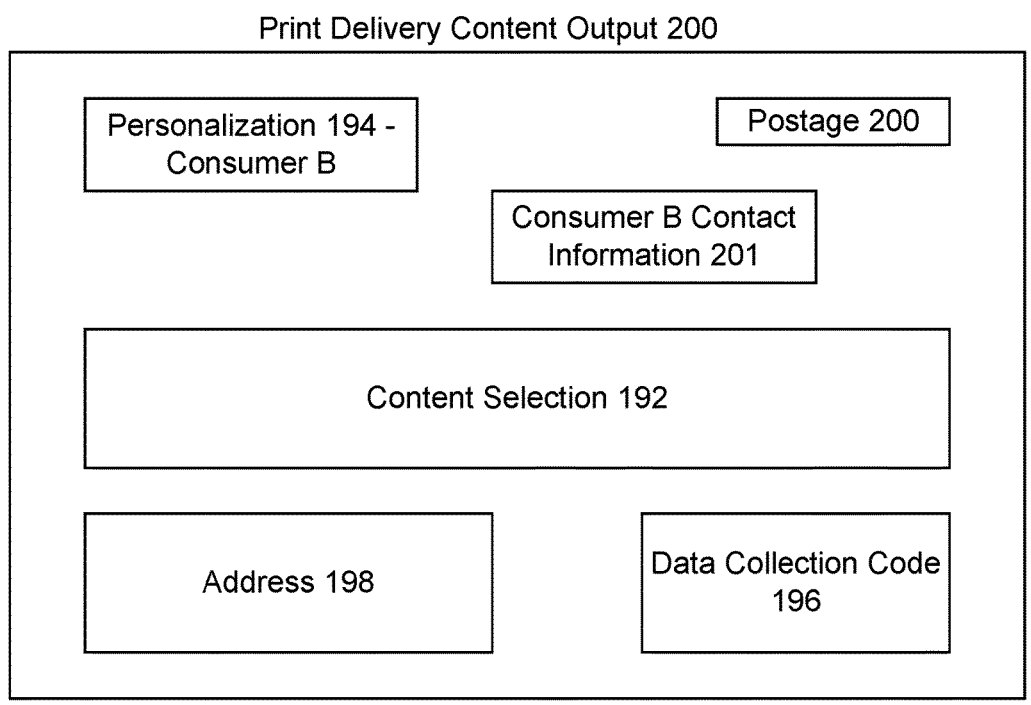
FIG. 6B is a schematic view of a personalized content output for a single advertisement for print delivery.

FIG. 6B shows print delivery content output 200, including content selection 192 from a single content provider. Print delivery content output 200 includes personalization 194 that addresses the content to a specific member of the target audience. In the embodiment illustrated in FIG. 6B, personalization 194 may include the name of Consumer B. Print delivery content output 200 also includes a data collection code 196 and an address 198 where print delivery content output 200 can be redeemed. Print delivery content output 200 also includes the consumer's contact information 201, such as the consumer's mailing address. In the embodiment illustrated in FIG. 6B, print delivery content output 200 may include the mailing address of Consumer B.

Figure 7A:
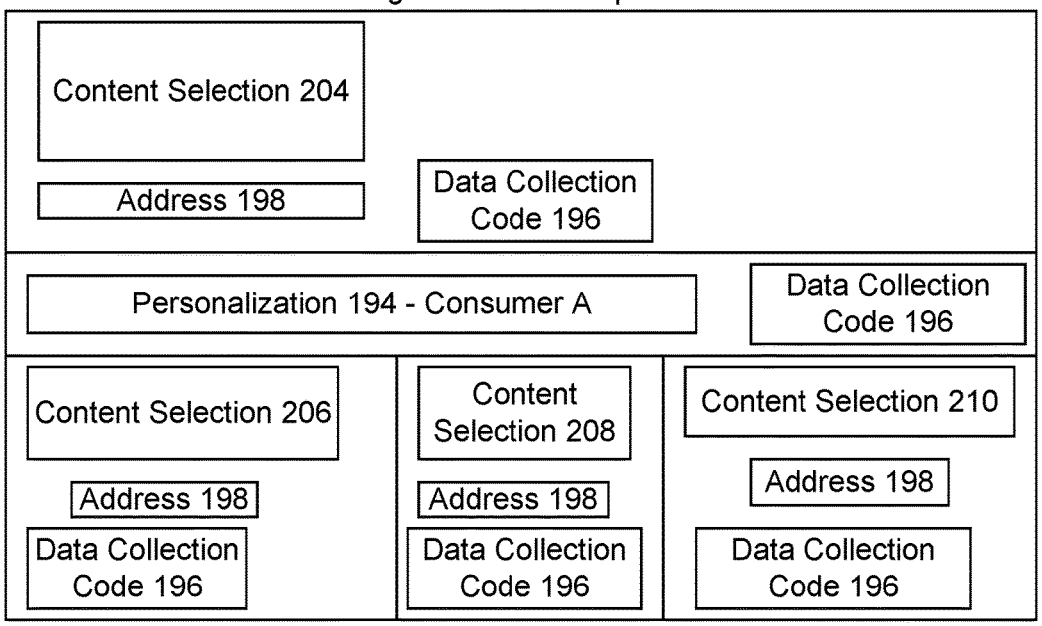
FIG. 7A is a schematic view of a personalized content output for multiple advertisement digital delivery to a member of a target audience.

FIG. 7A shows personalized digital content output 202 that includes content selections 204, 206, 208, and 210 from multiple content providers directed to a single member of the target audience. Each content selection 204, 206, 208, and 210 has an address 198 for redemption of the content selection and data collection code 196. The digital content output 202 also includes personalization element 194. In the embodiment illustrated in FIG. 7A, personalization element 194 may include the name of consumer A or a personalized message, such as "Happy Birthday, Amy!"

Figure 7B:
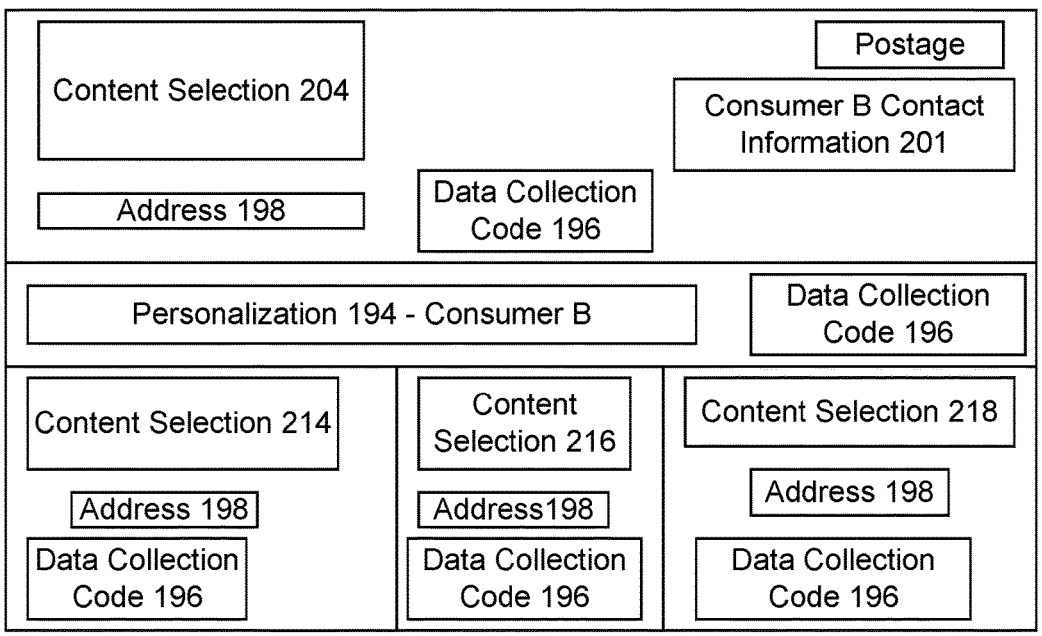
FIG. 7B is a schematic view of a personalized content output for multiple advertisement print delivery to a member of a target audience.

FIG. 7B shows physical delivery content output 212 that includes content selections 204, 214, 216, and 218, from multiple content providers directed to a single member of the target audience. Each content selection 204, 214, 216, and 218 has an address 198 for redemption of the content selection and data collection code 196. The physical delivery content output 212 also includes personalization element 194 and the consumer's contact information 201. In the embodiment illustrated in FIG. 7A, contact information 201 may include the mailing address of Consumer B.

FIGS. 7A and 7B provide an example of a single content provider, such as an ice cream store, selecting both digital and print delivery for content selection 204 resulting in digital content output 190 and print delivery content output. In this embodiment, the content provider also selected an option to allow content selection 204 to be included with content selections of other content providers. While both Consumer A and Consumer B share a common characteristic resulting in inclusion in the target audience for content selection 204, Consumer A either did not meet the characteristic criteria selected by the content providers of content selections 214, 216, and 218 or an algorithm of software 64 sent different content selections 206, 208, and 210 to Consumer A based on other factors, such as collected data. Likewise, Consumer B either did not meet the characteristic criteria selected by the content providers for content selections 206, 208, and 210, or an algorithm of software 64 sent different content selections 214, 216, and 218 to Consumer B.

Figure 8A:
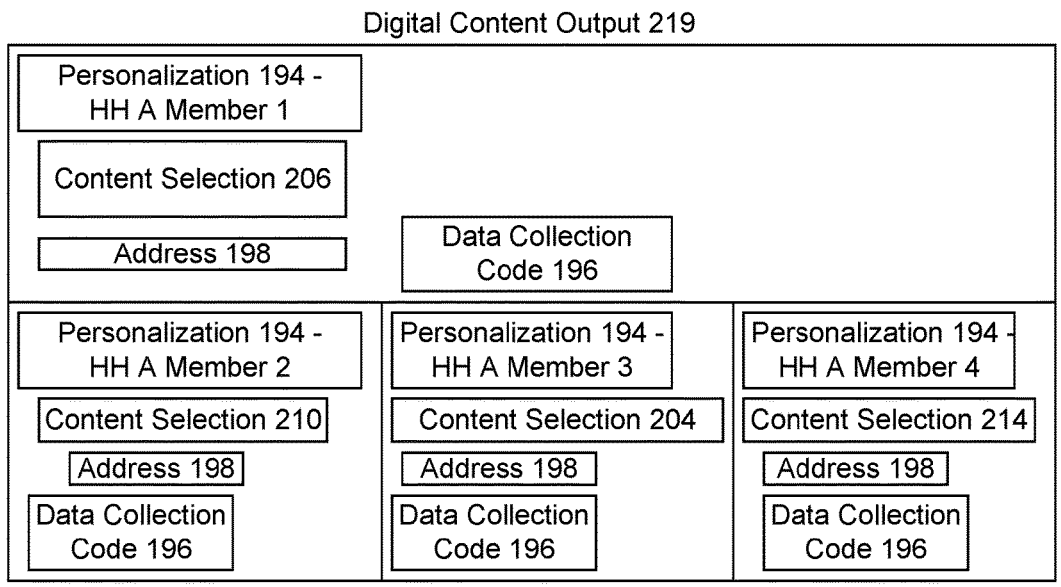
FIG. 8A is a schematic view of a personalized content output for multiple advertisement digital delivery targeted to multiple members of the same household.

FIG. 8A shows digital content output 219 that includes content selections 204, 206, 210, and 214 from multiple content providers directed to multiple members in a single household. As shown in FIG. 8A, the content selections 204, 206, 210, and 214 each include a personalization 194 for the household member (designated HH Member in FIG. 8A) to which they are directed, such as the household member's name. Each content selection may be directed to a particular household member because that household member meets a characteristic criteria selected by the content provider to be included as part of the target audience for the particular content selection.

Figure 8B:
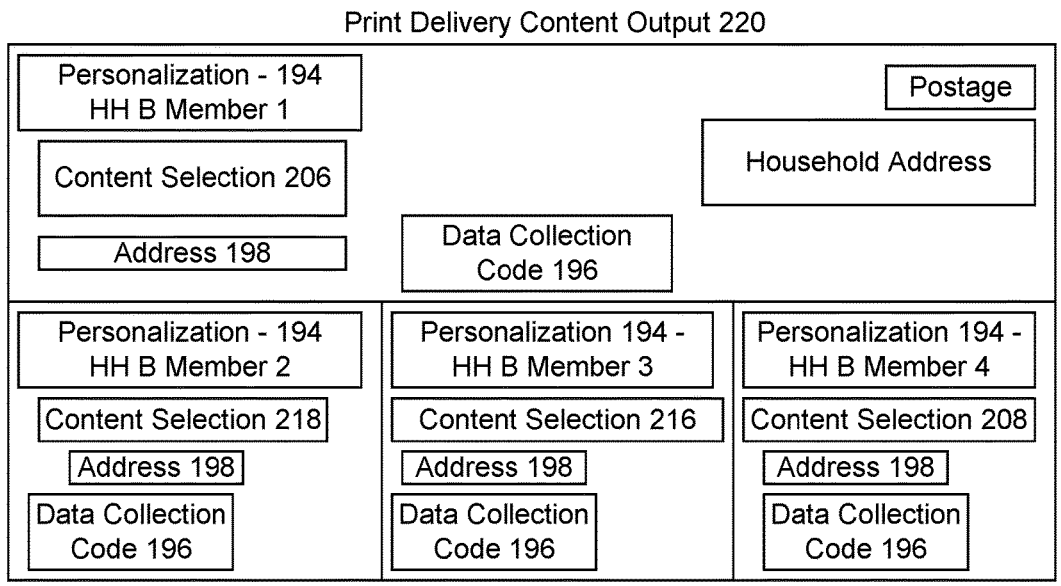
FIG. 8B is a schematic view of a personalized content output for multiple advertisement print delivery targeted to multiple members of the same household.

FIG. 8B shows print delivery content output 220 that includes content selections 206, 208, 216, and 218 from multiple content providers directed to multiple members in a single household. The content selections 206, 208, 216, and 218 each include a personalization 194 for the household member (designated HH Member in FIG. 8B) to which they are directed, such as the household member's name. Each content selection may be directed to a particular household member because that household member meets a characteristic criteria selected by the content provider to be included as part of the target audience for the particular content selection.

FIGS. 8A and 8B provide an example of a particular content provider, such as a spa service, selecting both digital and print for delivery for content selection 206 resulting in its inclusion in digital content output 219 delivered to a first household (HH A) and print delivery content output 220 delivered to a second household (HH B). In this embodiment, the content provider also selected an option to allow content selection 206 to be included with content selections of other content providers. While both HH A Member 1 and HH B Member 1 share a common characteristic resulting in inclusion in the target audience for content selection 206, HH A Member 1 and the other members of HH A did not meet the characteristic criteria selected by the content providers of content selections 208, 216, and 218 or an algorithm of software 64 sent different content selections 204, 210, and 214 to the other members of HH A based on other factors, such as collected data. Likewise, HH B Member 1 and the other members of HH B did not meet the characteristic criteria selected by the content providers for content selections 204, 210, and 214, or an algorithm of software 64 sent different content selections 208, 216, and 218 to the other members of HH B.

The method and system described herein may include any combination of the steps, features, and/or functions described herein.

While preferred embodiments of the present invention have been described, it is to be understood that the embodiments described are illustrative only and that the scope of the invention is to be defined solely by the appended claims when accorded a full range of equivalents, many variations and modifications naturally occurring to those skilled in the art from a perusal hereof.

What is claimed is:

1. A method for sending content to a target audience using a server in communication with two or more devices and a database; the database including a marketing dataset containing a list of consumers, characteristic data for each consumer, and contact data for each consumer; the method comprising the steps of:
   a) the server receiving from each of the two or more devices a content selection, wherein each content selection is associated with a content provider account;
   a1) the server receiving from each of the two or more devices a delivery method selection, each delivery method selection associated with one of the content selections;
   b) the server receiving from each of the two or more devices a characteristic criteria selection associated with each content selection;
   c) the server receiving from each of the two or more devices a geographic criteria selection associated with each content selection, wherein the characteristic criteria selection and the geographic criteria selection associated with each content selection defines a target audience selection for the associated content selection;
   d) the server generating a target audience list for each content selection, wherein each target audience list includes a subset of the list of consumers from the marketing dataset, wherein the characteristic data for each consumer on each content selection's target audience list includes the characteristic criteria selection of the associated content selection, and wherein the contact data for each consumer on each content selection's target audience list includes a location indicator matching the geographic criteria selection of the associated content selection;
   e) the server saving in the database, target audience data for each consumer in each target audience list, wherein the target audience data indicates the one or more target audience lists on which the consumer is included;
   f) the server generating a personalized content output associated with each consumer included in each of the target audience lists based on the target audience data, wherein the personalized content output includes the content selection associated with each of the one or more target audience lists on which the consumer is included or the content selection associated with a subset of the one or more target audience lists on which the consumer is included, wherein each personalized content output includes a plurality of content selections associated with a common delivery method selection;
   f1) the server prioritizing each of the plurality of content selections included in the personalized content outputs for each consumer;
   g) the server determining whether a quantity of the prioritized content selections is greater than a threshold amount;
   g1) responsive to the quantity of prioritized content selections being less than or equal to the threshold amount, the server sending each of the personalized content outputs to the associated consumer via the corresponding common delivery method selection; and
   g2) responsive to the quantity of prioritized content selections being greater than the threshold amount, the server sending (1) a first amount equal to the threshold amount of higher prioritized content selections in each of the personalized content outputs to the associated consumer via the corresponding common delivery method selection and (2) a second amount of lower prioritized content selections in each of the personalized content outputs to the associated consumer via a second delivery method.

2. The method of claim 1, wherein each of the two or more devices includes a desktop computer, a laptop computer, a handheld computer, a smart phone, a smart television, a smart watch, or a tablet, and wherein the server communicates with each device through a webpage or application.

3. The method of claim 1, wherein each delivery method selection includes email, text, digital display, application push, website display, or print delivery.

4. The method of claim 3, wherein the common delivery method selection for a print subset of personalized content outputs is print delivery, and wherein in steps (g1) and (g2) the server transmits the print subset of personalized content outputs to at least one printer for printing each of the print subset of personalized content outputs, and wherein in step (g2) the second delivery method includes digital display, application push, or website display.

5. The method of claim 1, wherein each characteristic criteria selection includes demographic data, psychographic data, or inclusion in a pre-selected group.

6. The method of claim 1, wherein step (f) further includes the server retrieving from the database a personalization item for each consumer included in each target audience list, and wherein each of the personalized content outputs further includes a personalization feature based on the personalization item for the associated consumer.

7. The method of claim 1, further comprising the step of:
   d1) the server transmitting to each of the two or more devices a total number of consumers in the target audience list.

8. The method of claim 1, wherein each personalized content output further includes a data collection code associated with at least one of the content selections included in the personalized content output.

9. The method of claim 1, further comprising the steps of:
   a1) the server receiving from a consumer device, characteristic data and contact data for a responding consumer;
   a2) the server saving in the database, the characteristic data and contact data associated with the responding consumer; and
   wherein in step (d) the responding consumer is included in at least one target audience list for which the responding consumer's characteristic data includes the characteristic criteria selection of the associated content selection and for which the responding consumer's contact data includes a location indicator matching the geographic criteria selection of the associated content selection.

10. The method of claim 1, further comprising the steps of:
    a1) the server receiving from a consumer device, content preference data for a responding consumer;
    a2) the server saving in the database, the content preference data associated with the responding consumer;
    wherein in step (d) the responding consumer is included in only target audience lists associated with content selections matching the content preference data for the responding consumer; and
    wherein in step (f) the personalized content output associated with the responding consumer includes only content selections matching the content preference data for the responding consumer.

11. The method of claim 1, wherein the common delivery method selection includes digital display, application push, or website display, and wherein in step (g2) the second delivery method is print delivery via at least one printer.

* * * * *